(12) United States Patent
Chombo (10) Patent No.: US 6,313,828 B1
(45) Date of Patent: Nov. 6, 2001

(54) ELECTRONIC BOOK (76) Inventor: Carlos Landetta Chombo, Boulevard B. Quintana 5410, Residencial Viveros D-8, Queretaro, Queretaro 76150 (MX)

( * ) Notice: Subject to any disclaimer, the term of this patent is extended or adjusted under 35 U.S.C. 154(b) by 0 days.

(21) Appl. No.: 09/308,056

(22) PCT Filed: Nov. 12, 1997

(86) PCT No.: PCT/MX97/00034

§ 371 Date: Jun. 22, 1999

§ 102(e) Date: Jun. 22, 1999

(87) PCT Pub. No.: WO98/21665

PCT Pub. Date: May 22, 1998

(30) Foreign Application Priority Data

Nov. 12, 1996 (MX) .................................................. 965558

(51) Int. Cl.$^7$ ...................................................... G09G 5/00

(52) U.S. Cl. ........................... 345/169; 345/173; 345/901

(58) Field of Search ..................................... 345/156, 168, 345/173, 174, 901, 179, 169, 905; 178/18.01, 18.11, 19.01–19.07; 361/681; 364/708.1

(56) References Cited

U.S. PATENT DOCUMENTS

| 5,467,102 | 11/1995 | Kuno et al. . |
| 5,475,399 | 12/1995 | Borsuk . |
| 5,534,888 | 7/1996 | Lebby et al. . |
| 5,663,748 | * 9/1997 | Huffman et al. ...................... 345/173 |
| 5,847,698 | * 12/1998 | Reavey et al. ....................... 345/173 |

FOREIGN PATENT DOCUMENTS

| 2 657 187 A1 | 1/1990 | (FR) . |
| 2 260 844 A | 4/1993 | (GB) . |
| 0 390 611 A2 | 3/1990 | (WO) . |
| 0 646 855 A2 | 9/1994 | (WO) . |

* cited by examiner

Primary Examiner—Bipin Shalwala
Assistant Examiner—Mansour M. Said
(74) Attorney, Agent, or Firm—Helfgott & Karas

(57) ABSTRACT

This invention relates to an electronic book comprising a structure capable of being spreaded into two sections, connected to each other by means of assembly element of the hinge type, which provides the controlled movement of said two sections upon said assembly element; to provide for the opening and closing of said electronic book; and also to provide for the passage of the several analogic and digital interconnection elements required to interconnect the components of the hardware model.

14 Claims, 3 Drawing Sheets

ELECTRONIC BOOK

FIELD OF THE INVENTION

This invention relates to electronic devices for processing and displaying information within the computation field more particularly related to an electronic book.

BACKGROUND OF THE INVENTION

Beyond any doubt, a book constitutes one or the most values tools for he kind along the entire history thereof.

Books, as we nowadays know them in their different types and appearance qualities (covers, back, sheets, etc.), is the result from a secular evolution that included the use of any imaginable type of materials, previous to the arrival of the paper age.

With the invention of mechanical press, in the fifteenth century, books became an industry, which has amounted to great proportions due to several features of historical, economical and social nature; being one of the most outstanding the intensive spreading of information in the worldwidth. This fact, together with the huge technological advance in the communication field during the present century, has driven the book industry to the prominent level it has today.

The presence of books in human evolution for centuries has resulted in that book has become completely and naturally embeded in our culture, thus forming what can be termed the book culture.

Book culture is linked to an array of habits and customs underlaying the paradigm associated to the intimate experience rising from reading a book which, in its essential meaning places a reader in front of the ideas written by somebody else, which mean knowledge, feelings, information, etc.

On the other side, with computer as a central element, the technology focussed on the handling of information, constitutes nowadays a culture of its own, accesible for both the layman and the specialist.

The intensive use of the resources of said informatics culture has established the need of developing versatile and efficient options for storing information, wherein the trend is to adopt the compact disc (better known as CD after the initials of its English name) as a most suitable means for this purpose, far beyond from the original application thereof limited to the storing of music recordings.

So far, compact discs are increasingly becoming the most excellent storing means, and there is already in the commerce a real boom with all kind of application offers In said format. Within said applications, the storing of information normally contained in books already represents a provisory future; there being already a broad repertory of options: CD encyclopedias, CD children's books, CD language courses, etc.

However, up today, books available in compact discs are directed to be accessed only and exclusively by means of personal computers which, during said application, are far away from the book paradigm due to obvious design reasons, prevailing the computer paradigm which has its own backgrounds in the combination of typewriter paradigm (keyboard) and television paradigm (monitor). This means that although there is a broad range of models and possibilities, computers maintain the concept of a keyboard and a monitor.

The couple constituted by a personal computer and a, book stored in a compact disc has been considered as impractical, incomplete and unsuitable, since a computer is not deemed as the ideal means to appeal into the reading of a book, the information of which resides in electronic means.

As a consequence of the above, it has been searched a means that allows for the elimination of the above recited difficulties and the provision of an electronic book wherein the peak technology in computers and the original concept of book can be merged, through the application of an electronic device that allows the joint use of facilities and tools proper of the state of the art in computers and of the habits, costumes and ergonomies associated to the general use of a book, as printed on paper.

OBJECTS OF THE INVENTION

With the prior art drawbacks in mind, it is an object of this invention to provide an electronic book that allows the interactive display or information, from electronic/optical storing means, in a functional, simple and practical way, keeping in effect the conventional concept of what a book is.

It is another object of this invention to provide an electronic book that, further to carry out the conventional function of printed books, as a universal communication means, also takes advantage of the peak technology in the informatics art.

It is also an object of the present invention to provide an electronic book that, due to its characteristics of design, is entirely versatile allowing thus the operation thereof at any time and in any place, thus complying with the characteristics of a conventional book.

It is another further object of this invention to provide an electronic book that provides for the maintenance and obtaining of the information stored in a library, through the use of electronic means with minimal space requirements.

BRIEF DESCRIPTION OF DRAWINGS

The novel features considered as characteristic of this invention will be particularly pointed out in the appended claims. However, the invention proper, both regarding the organization and the operation method thereof, together with other further objects and advantages thereof, will be better understood when the following description of certain embodiments, is read jointly with the drawings accompanying Hereto, wherein:

DETAILED DESCRIPTION

Figure 1:
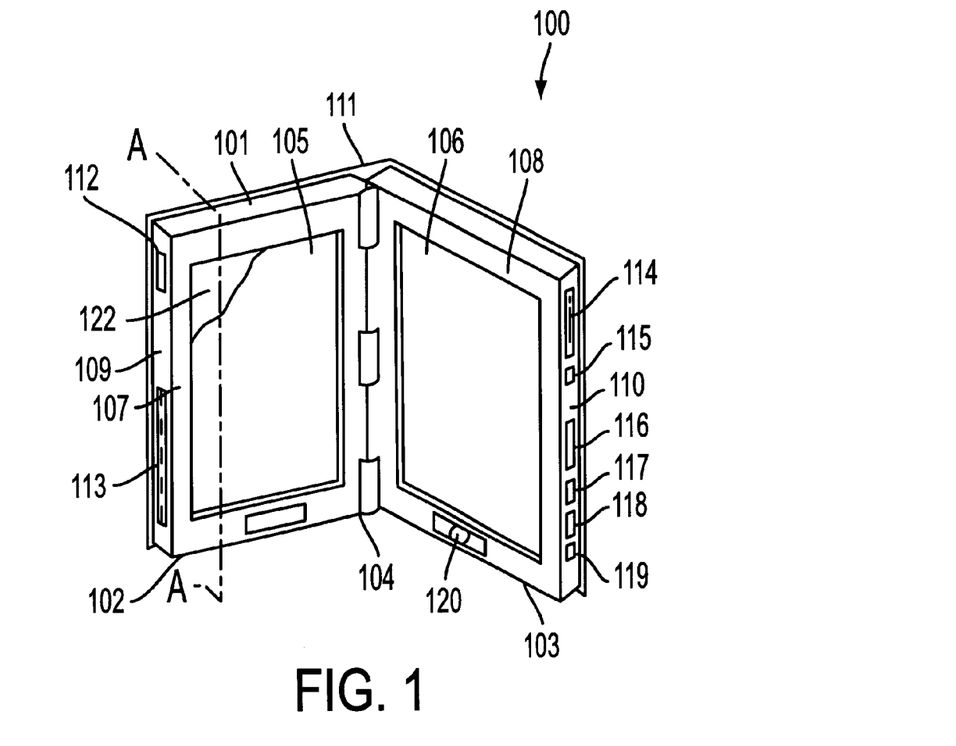
FIG. 1 is a front perspective view of an electronic book in an unfolded position, in order to show the dual screen thereof, constructed according to the principles of the present invention.

Referring now more particularly to the drawings, and specially to FIG. 1 thereof, an electronic book of this invention will be disclosed in a spreaded position; there being understood that said electronic book will be described with the use of compact discs as the source of information. However, it is to be emphasized that said electronic book is rather of general application, and that any other information bank from any remote source, could be employed, for instance, from a personal computer or a greater information ban, provided said information is formatted to be useful with this type of electronic devices. Accordingly, the following description of the various embodiments of the electronic book of this invention, described in connection with a compact disc, should not be considered as restrictions to this application, but simply as illustrations thereof, since said electronic book is of general application and its description in connection with compact discs is given only for clarity sake.

The electronic book 100 of the present invention comprises a structure 101 spreadable into two sections 102 and 103, preferably of rectangular shape, which are connected to each other by means of an assembly element 104, which in this embodiment is a mechanism of the hinge type or the like, for the controlled movement of said rectangular sections 102 and 103 on said assembly element 104, in order to facilitate the opening and closing of said electronic book 100, as well as the passage of the several analogical and digital interconnecting means required for the interconnection of the internal components of said electronic book 100.

It is important to said that said assembly element 104 can be any other mechanism resulting in the union and controlled movement of said rectangular sections 102 Ad 103, such as, for instance, among others, retractable mechanisms, jointed mechanisms, etc.; furthermore, the opening and closing of said rectangular sections 102 and 103 also can be effected by automated means providing for the automatic opening and closing of said rectangular sections 102 and 103, by simply pressing of a switch.

Rectangular sections 102 and 103 include liquid crystal screens 105 and 106, respectively, preferably of rectangular shape, for displaying the information accessed to said electronic book 100; with said liquid crystal screens being optionally of a conventional type or else of the "touch screen" type. In the embodiment being described said screens are preferably of the touch screen type.

Screens 105 and 106 include each, around the same, bevels 107 and 108, respectively, such that the screen-bevel assembly mimics the pages of a conventional book, with their corresponding margins.

Said rectangular section 103 in the embodiment being described includes, at the lower section thereof, and within an area comprising said bevel 108, an inlet means 120 to control the screen cursor, preferably of the type known as mouse, which is integrated to said bevel 108 of the rectangular section 103 of said electronic book. It is important to point out that said inlet means 120 can be positioned either on said bevel 108 or on the bevel 107 of the rectangular section 102 of said electronic book, depending on the design requirements.

At the side end 109 of said rectangular section 102, opposite to the back 111 of said electronic book 100, a switch means 112 to enable and disable said electronic means and a slot 113 for the introduction of compact discs are suitably distributed along the entire length thereof.

On the side end 110 or the rectangular section 103, and opposite the back 111 of said electronic book 100, a so-called general purpose PCMCIA slot 114, preferably of Type III, useful to add additional means to the electronic book thus allowing the transfer of information therethrough; an inlet connection 115 for audio devices, preferably of a conventional type; a parallel port type means 116, for communication with peripheral devices, such as printers, floppy disks and computers for inlet/outlet of information; a fax-modem interface device 117, for sending information by telephone to a remote device, such as a fax or a personal computer; an inlet connector 118 for an optional peripheral keyboard; and a connector 119 for an AC/DC converter, preferably of the conventional type, extend along the entire length of said end 110.

Devices employed in the transfer of information can be, among others, memory expanding devices, fax-modem devices for mobile phones, sound card devices, etc.

Figure 2:
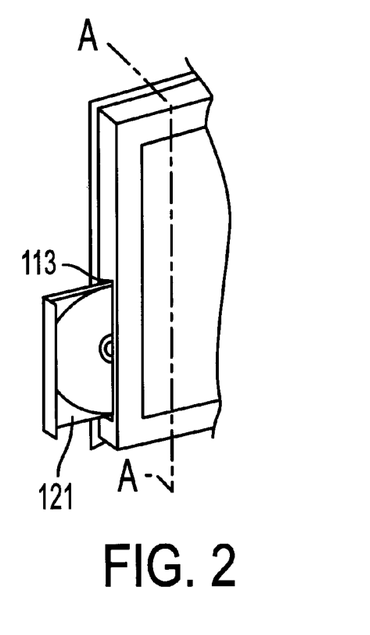
FIG. 2 is a detailed perspective view, following the lines A–A' of the electronic book shown in FIG. 1.

FIG. 2 shows a detailed view of the manner in which an information loaded compact disc 121 is introduced through said slot 113 of the electronic book 100, for the processing and displaying of the information on screens 105 and 106 of said electronic book 100.

Figure 3:
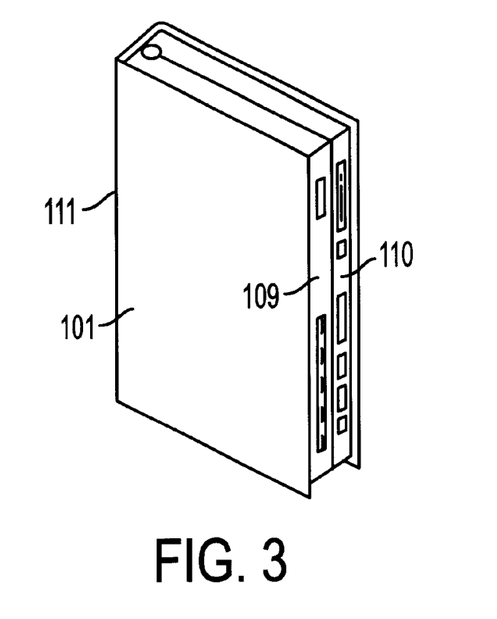
FIG. 3 is a perspective view showing the electronic book of this invention in a closed position, constructed according to the principles of the present invention.

Regarding FIG. 3, an electronic book 100 of the instant invention is shown in a closed position, wherein, am it can be seen, the outer surfaces of the structure 101 of said electronic book resemble the covers of a conventional book.

Figure 4:
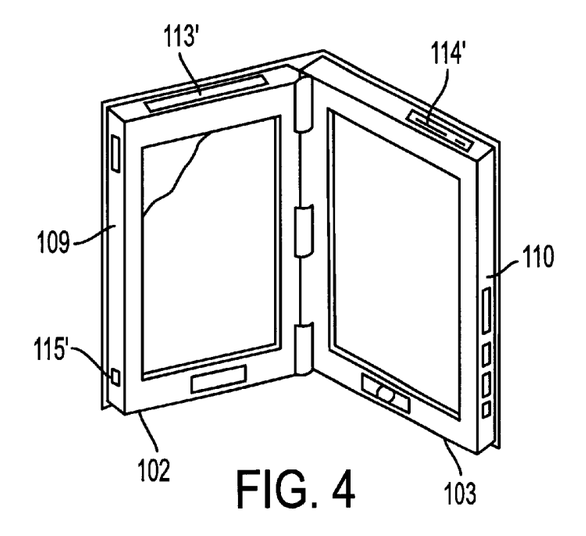
FIG. 4 is a front perpective view of the electronic book of FIG. 1, in an spreaded position, constructed according to the second embodiment of the present invention.

An a second embodiment of this invention, an electronic book 100 is shown in FIG. 4, wherein the position of the compact disc slot 113, the general purpose PCMCIA slot 114 and the inlet connection 115 for audio devices, have been all modified and are identified with numerals 113', 114' and 115', respectively. In this embodiment, slot 113' is preferably positioned on the upper side end of section 102; slot 114' is preferably positioned on the upper side end of section 103, and the inlet connection 115' in preferably positioned on the lower section of said side end 109.

Figure 5:
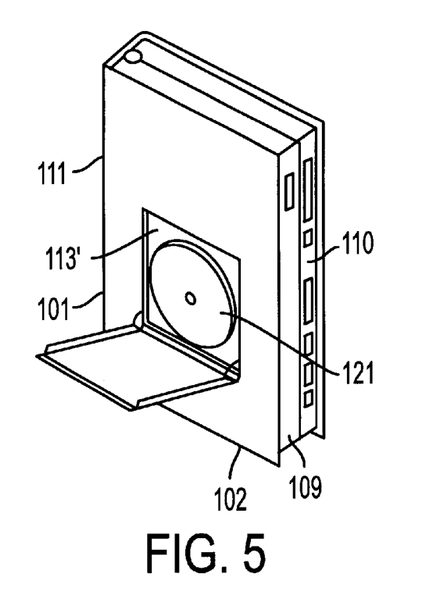
FIG. 5 is a perspective view of the electronic book of FIG. 3, constructed according to a third embodiment of the present invention.
Figure 6:
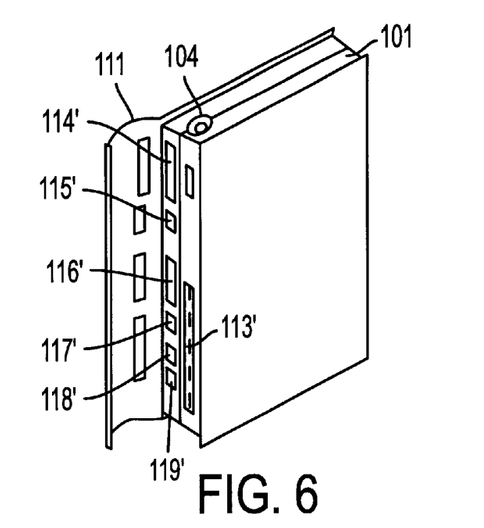
FIG. 6 is a perspective view from behind, showing an electronic book constructed according to a fourth embodiment of the present invention.

In connection with FIG. 5, there is shown therein a third embodiment of the electronic book of this invention, including a slot 113" preferably positioned on the outer surface of section 102 of said electronic book 100, in order a compact disc 121 be introduced therethrough, As a fourth embodiment of this invention, FIG. 6 shows the electronic book 100 of this invention wherein a compact disc slot 113''', a general purpose PCMCIA slot 114''', an inlet connection 115''' for audio devices, a parallel port type device 116''', the fax-modem interface device 117''', the inlet connection 118''' for an optional peripheral keyboard and a connection 119''' for an AC/DC converter, are all preferably situated on the back 111 of said electronic book 100.

It is important to state that the outer surfaces of said electronic book 100 can be manufactured with some type of texturized finish or surface coverage, In order to resemble more closely the common appearance of a conventional printed book; there being also possible to use sheath-type covers which also serve as outer envelops for said book.

Parts constituting said structure 101 and bevels 107 and 10 of said electronic book 100 can be made preferably of molded plastic materials, such as, for instance, polystyrene and/or ABS resin; however, it is also possible that metallic materials and the alloys thereof are used, as well as composite materials including combinations of alloys, plastics and ceramics.

Structure 101 must be manufactured having in mind the arrangement of the internal parts of the electronic books, divided into both sections of said device; in order to have the weight thereof distributed in the best possible manner, taking into account that the weight of one of said sections 102 or 103 shall be greater than the other, due to the batteries required by the electronic book during its operation.

Furthermore, said electronic book 100 can comprise special attachments such as, among others: a book-rack (non shown in Figures) of optional use on an even surface; an AC/DC adaptor (non shown in Figures); removable anti-reflection screens 122; an optional peripheral reader for a second CD (non shown in Figures).

As it can be seen from the above disclosure, the electronic book of this invention is conceived as an innovating alternative to the function carried out by a conventional printed book; wherein it is intended that the spirit of said universal concept (book) is maintained regarding the basic ratio of physical characteaisctics-use thereof; and therefore, in connection with the basic atributes of design and the functional premises (size, weight, handeability, two-pages design, the manner to access the contents, its general appearance, etc.).

Starting from said premise, powerful resources are incorporated in the electronic book of this invention, provided by electronics and computer sciences, in order to give the electronic book an assembly of capabilities anal facilities making it an ideal book.

The considered attributes of an ideal book are primarily based on the possibility of an interactive relationship with the user, and include, among other, the following characteristics: a) fast access to the contents with multiple display options on screens; b) co-relation option of the text contents to each other or to available glossaries, including two or more languages; c) multiple and flexible addressing and searching options; d) personalizing options for the exhibition of the contents; e) versatile options for the pagination modes including independence among pages and management of windows; f) multiple options for selecting the contents and the arrangement of selections; g) text storing, export and import options; h) pointer options with maintenance of the status of the last session; i) zoom option on graphics, maps and pictures; j) option for notes and remarks; multimedia option, including the possibility of simultaneous audio (voice, music, sound effects); l) interconnection capability to other information sources, thus giving access to information resident in electronic libraries in the world over via fax-modem either conventional or mobile; m) option of exhibition of motion images; n) simple and intuitive operation by means of icons, menus and digitalized keyboard on screen; nn) portability of the equipment due to the weigth, volume, etc., characteristics thereof, by enclosing in a compact and self-sustained device, all the tools and options for the user; o) compatibility with optional peripheral equipment (printers, personal computers, floppy discs readers, etc.); p) communication possibility to another electronic book, etc.

In order to satisfy the above mentioned aspects, the electronic book of this invention includes, among other, the following functions: a) displaying: synchronous pagination; asynchronous pagination, screens frosting, use of windows, automatic pagination (quick revision of the entire document or a portion thereof, pagination at preset intervals, programmable pagination, etc); b) addressing (GOTO options): standard, page by page, by a pointer of the last session, chapter by chapter, by theme or by key word; c) personal preferences: size of characters, line spacings, line indicator, selection exhibition, general preferences for the information display (combination of colors, design of menus and icons, etc.); d) processes: text selection (options: display, save, export, print), searching text correlation, personal notes, zoom, multimedia; e) auxiliary functions: help, clear memory, reset, undo, printer configuretion, system messages; f) functions for creation and management of riles: save, erase, print, communications, remote source and/or target.

In the embodiment being described, said electronic book also comprises the use of music CD's as an alternatives to the reproduction of the written information stored in compact disc, in addition to other further services, ouch an electronic diary or calculator.

In another further embodiment, said electronic book can also incorporate the operation of a second CD reader for the simultaneous reproduction of a a first compact disc containing written information and another compact disc with music.

Figure 7:
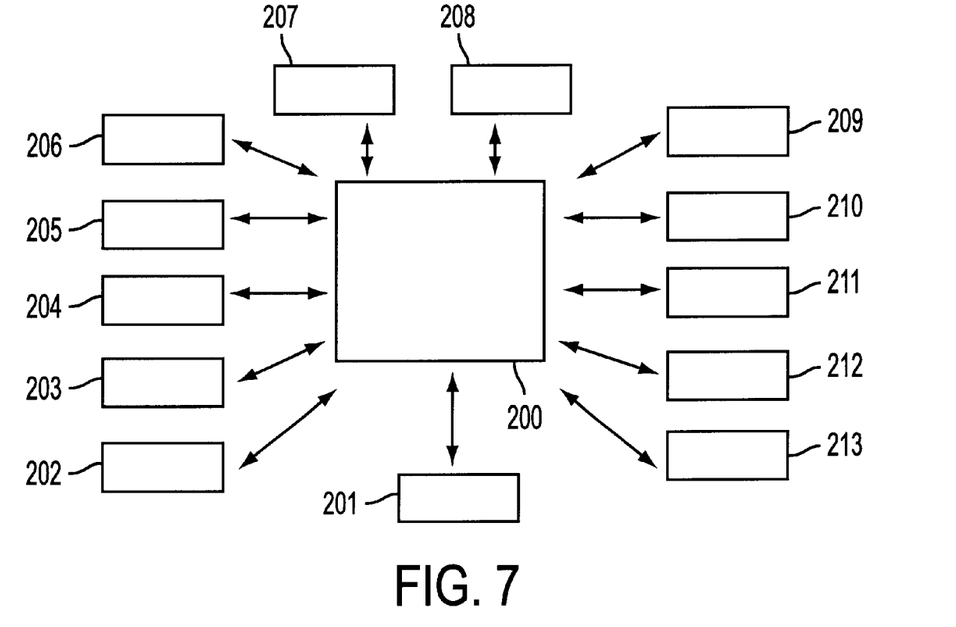
FIG. 7 is a block diagram that points out the basic and complementary components of the hardware model used in the electronic book of the instant invention.

A block diagram is shown in FIG. 7 of the components of a hardware model employed with the electronic device of this invention; being said components within the most advanced state of the computational art, thus providing a basical, consistent and complete solution to the requirements of the users of said electronic device.

The hardware model components support the basic operation as well as the auxiliary services of the electronic book and comprise a series of main components plus a series of components to provide accesory services. Main components of the hardware model of this invention comprise a microprocessor 200, a ROM type memory 201, storing a master program or a portion thereof; a CD interface 202, a compact disc reader 203, a RAM merry 204, a hard disk 205, which either may or not contain the complementary portion of said master program; a bidirectional parallel port 206, an audio processor 207, at least a video processor 208, digitalizing means 209 (touch screens and integrated mouse) and a power supply system 210; and said accesory components comprise a fax-modem slot 211, a general purpose PCMCIA slot 212, and a connector 213 for an optional peripheral keyboard.

Said main components contribute to the comply by the electronic book of all of the functions for which it has been designed, such as transferring information from the electronic book to a remote computer or a connection for the exchange of information with remote sources/targets.

Microprocessor 200 represents the brain of said electronic book; and the function thereof is to process all of the commands received from the user and from other blocks of the system, as well as to generate and send to the different parts of the equipment, the instructions necessary to execute said commands.

The component considered for the embodiment being described, is an at least 32-bits microprocessor with a minimum speed of 33 MHz, preferably 133 MHz, to control the information traffic between the compact disc reader 203, said RAM memory 204 and the parallel port 206, the fax-modem interface 211 and the video processor 208.

ROM memory 201 function is to keep the master program of the system, which controls of all and every operations carried out by the electronic book.

When the equipment is turned-on, said master program instructs the microprocessor to execute the self-verification routine of the system. Then, it instructs the microprocessor to detect the presence of a disc within said compact disc reader 203 and, when appropriate to charge the indicators of the disc status, should this latter had been previously opened.

Said master program receives and manages the instructions generated, instructing said microprocessor what to do in order to carry out the corresponding operation; taking thus in charge the correct operation of the equipment.

Interface 202 is a physical and logical interconnection means between said microprocessor and the origin and target of the information flow, subject to the signal, received on the instructions bus.

Thus, said interface 202 serves as a link between said hard disk or said compact disc reader and the information contained in the memory of said equipment. Optionally, it can provide a link to an additional outboard compact disc reader.

The function of said compact disc reader 203 is to show its status to the microprocessor, thus informing whether there is a compact disc at said reader (and also whether there is an error therein), the compact disc format, the name of the disc at said reader, etc.; and furthermore, to transmit the contents of said compact disc to be displayed on the screens comprised in said video processor block 208.

The embodiment under description is based on a 5 ¼ inchs compact disc reader with IDE technology.

When a disc is read, the information obtained will be transferred to said RAM memory 204, in such a form that the same can be displayed on the screens of said video processor 208 and, as the case be, can be transferred outwardly via parallel port 206 or fax-modem interface 211

In the embodiment begs described, said RAM memory block 204 is comprised of two parts: a main first part corresponding to the memory circuits of the electronic book, and an second part corresponding mainly to the support circuits of the addresses and maintenance decodifier.

The memory circuits of RAM memory block 204 allow for the storing of the information from either the compact disc or the remote source, thus minimizing the continuous access to the disc reader 203. Accessing the information from memory RAM 204 is a great deal faster than from compact disc reader 203, since this latter employs mechanical parts, which are rather slower than electronic parts.

Upon transferring the information from either a compact disc or a remote source into RAM memory 204, an advantage is provided of being able to see, search, select, print, mark and, in general, interactively manipulate said information.

On the other side, the support electronic circuits provide for choising the memory location wherein said information is to be read or written, by means of an address decoder chip, as well as the maintenance of the information, contained in the RAM memory of said electronic book through other support circuits.

The embodiment under description comprised mainly dinamic RAM Emory modules, which can vary within a range of from 4 to 16 Mbytes of memory.

Said hard disk 205 is a magnetic means for storing information.

As such, its role is to store information or partially or entirely recover the file(s) constituting said displayed book, as well as the operation itself of said. electronic book (pointers, notes, selections, etc.).

Additionally, said hard disc 205 could contain a portion of the master programa stored thereon, thus allowing that ROM memory 201 housing a first portion of said master program, is not too huge, depending on the definite design of the internal components and on the functional expectations.

The embodiment being described herein is based an an IDE 120 Mbytes hard disk.

The bidirectional parallel port 206 is a port for inlet/outlet of information.

Said parallel port 206 provides communication of the electronic book to peripheral means, such as printers, floppy disk units and computers, giving thus an opportunity to transfer the information into said means and additionally to transfer the selected information to the printer, through the menus and icons digitally shown on the screen: of said electronic book.

The audio processor 207 is based on the operation or a digital/analogic converter and a wave synthetizer, by transforming the digital information contained in said compact disc or the remote source, into an analogical signal that can be heard.

Said audio processor 207 provides the opportunity to have stereo audio, either through headphones or by means of outer loudspeakers, through an audio outlet and a mini-jacket.

The video processor 208 manages the display of information, icons, menus, etc., on both screens of said electronic book, with all of the capabilities and flexibilities as determined by the master program, such as, for instance, page freezing, text selection, zoom, etc.

The embodiment being described is based on two video processors and 1 Mbyte memory only for video. The screens provided in this embodiment have a resolution of 640×480 pixels and can age up to 256 color tones; however, it is also possible to use greater resolution screens.

Digitalizing means 209 (touch screens and integrated mouse) show to said master program the position of the pointer on the screens of said electronic books, in association with the menu options, with the displayed information, with said icons, with the digitalized keyboard, with the text selections, etc. This will enable the activation of the several processes and functions available.

In the embodiment under description these two digitalization tools are included, giving consideration to their undistinct use, thus giving a greater flexibility of use to said device. It is considered the regular use through touch screens given their direct access and the use of mouse integrated into said electronic book for those manipulations requiring a greater precision.

The power supply system 210 provides the supply voltages suitable for every block, a battery package being employed preferably that provides a period of at least two hours of uninterrupted use, thus offering the facility of transporting the equipment without the requirement of an electric energy source.

Said block provides the detection by the user of the condition of the electric charge of said battery. The embodiment being disclosed is based on the power supply of a rechargable battery package of nickel hydride NiMH.

Accesory blocks of the electronic book, as already mentioned, comprise the fax-modem interface 211, the PCMCIA slot 212 and the optional peripheral keyboard connector 213.

Said fax-modem interface 211 effects the sending, on a telephone line, of the electronic book information to a remote means, such as, for instance, a fax machine, thus providing also the connection of said electronic book to a peripheral personal computer, situated at home or at the office or else the link to a possible bookstore or electronic library, on the phone line or by means of a direct connection.

The type III PCMCIA slot 212 adds to the electronic book versatile devices of type III PCMCIA card; said devices could be additional memory, fax-modem via mobile phone, sound-cards, etc., which offers the opportunity to transfer information through said means.

The optional peripheral keyboard connector 213 gives the user an option to use a peripheral extended keyboard. With said option, additional facilities are provided in case that a more frequent or Intensive use or the software tools related to writing are contemplated, such as notes or small memos. The described embodiments include a din-5 mini-jacket.

In another further embodiment, said electronic book can also comprise an inlet for a second compact disc reader, which makes possible to adapt a second compact disc reader, which allows for the user the simultaneous access to the information from two compact discs for reading or consulting them, or else, to display the written information in a compact disc, whilst a music selected by the user is listened from the second reader.

The hardware model shown in the block diagram of FIG. 7 is based on the following functional logic:

The electronic book is provided with a 32-bits data bus through which data and commands flow, and additionally is provided with an address bus serving to address the component to which or from which data traveling through said data bus are going to or coming from.

When is turned-on moment said master program (stored on ROM memory 201) sends through said data bus the commands needed for the microprocessor 200 to execute the self-verification routine of the components.

Next, said microprocessor 200 instructs the compact disc reader 203 that the name of the compact disc housed therein in read, in order to verify and compare the identification thereof with the pointer table kept at the hard disc 205, that had been previously generated by the reading of compact discs at the reader 203, and is saved later on the RAM memory 204.

Through the same data bus master program commands travel to microprocessor 200, which, in turn, sends commands to the different components, depending on the function being is executed by the electronic book. During the entire session of the electronic book operation, said master program sends to said microprocessor 200 the necessary commands for the suitable general operation thereof.

In case the operation being effected is to display the text information available at a compact disc, to present it to the user, the information travels through the data bus towards RAM memory 204 and thence to video processor 208, which displays the same on the corresponding screen, according to the instructions from the master program.

In another case, such as when information from the electronic book is to be transferred to a peripheral device, the information that was already read from a compact disc and, therefore, is already on RM memory 204, travels through the data bus towards the bidirectional parallel port 206, in order to be sent to the selected equipment, which previously was physically connected to the parallel port 206 of the electronic book. Should a long-distance transfer is required, it can be used an accesory facility of fax-modem interface 211 operating based on the use of telephone lines.

Furthermore, through the data bus also travel the information from controller circuit for digitalizers 209, by means of which the user is capable of state the option he/she desires, by pointing the icons or options in menu.

On the other side, the address bus carries lines of address generated by said microprocessor 200, to be used by an address decoder, which is an electronic integrated circuit receiving the address signals and selecting the site of the memory wherein said information will be read or written.

Interface 202 controls the information traffic traveling from or towards the compact disc reader and the data bus, as well as the information going to or coming from hard disc and data bus. A link is optionally provided to an additional outboard reader of compact discs.

Interface 202 circuits aside of being linking circuits, can also constitute selecting circuits, which provide for the traffic control of information from or towards said compact disc reader and data bus, as well as also the information coming from or towards said hard disk and data bus.

As can be seen, the electronic book of the instant invention is focussed to render services with versatile and improved possibilities, compared those that can be obtained presently from printed books; or compared to the information contained in compact discs, that only can be read presently by means of a personal computer.

In such a way, the applications that can be considered today with the device of this invention comprise different possibilities of use proper of a conventional printed book, such as, among others: general reading, specialized information consult, study and learning, recreation, digital diary, calculator, etc.; together with the fact that it has numerous advantages compared to a conventional printed book, among which there can be cited: 1) ecological aspects, since it contributes to avoid the paper waste, thus amounting to the preservation of forest resources; 2) globalization of information, when offers an alternative portable means to access to the information banks in the world over and also to the eventual increase of the electronic libraries; 3) culture spreading when it offers an alternative channel to diffusion of intellectual manifestations; 4) use of learning systems when it offers an interactive tool as an alternative to the learning, including the self-taught; 5) foreign languages diffusion, when it results in a clearly valuable means for teaching languages and for the diffusion of texts simultaneously published in more than one language; 6) use of the information storing technology, thus contributing to the management of the huge amounts of information registered on optical means (compact discs), thus making easy the transportation and storing thereof within reduced spaces; and 7) the economical aspect, since presently an intellectual work recorded on optical means is cheaper than one on a printed book, in view of the prices of raw materials and manufacture costs.

Regarding the need of managing the resources of said electronic book, as well as of supporting the functions hereof, a software model has been developed to a conceptual level, and was called a master program, contained on ROM memory 201 of the hardware model, as already mentioned.

Figure 8:
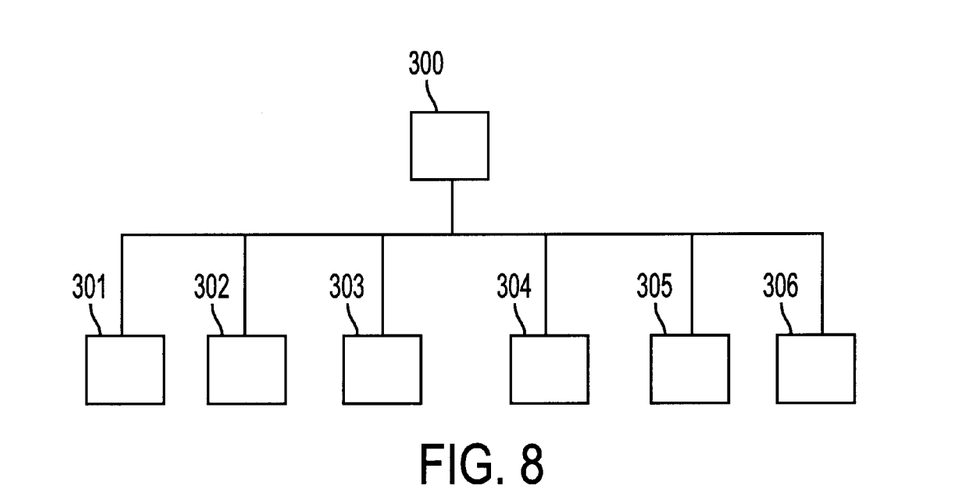
FIG. 8 is a block diagram showing the different modules of the master program used with the electronic book of the instant invention.

Said master program has as the main purpose thereof, to provide a better understanding of the routines and functions of said device, and also to provide a complement to the design definition base proposed for the hardware model components, in addition of being also an element inherent to the design, operation and concept of said electronic book given the fact that the same is the smart component thereof. In FIG. 8 a block diagram is shown of all of the operations constituting part of the master program.

Said master program, at its conceptual level, is comprised of seven modules covering all of the functions, resources and requirements of the smart system of said electronic book; that is, a coordinator module 300, a display module 301, a special options module 302, a multimedia module 303, an inlet/outlet (I/O) module 304, a function module 305 and a processing module 306.

Modules 301 through 306 of said seven modules, constitute the operation logics of said master program and carry out specific functions related to each other by said coordinator module 300, which also coordinates the interaction between the electronic book and the user.

Hereinbelow are described the specific functions of every module.

Coordinator module 300, as already mentioned, affords the data control and instructions flow between the different modules complementing the system; and also coordinates the actions effected by the system as a whole.

Display module 301 controls the data and instructions flow towards the information display screens, and also controls the different characteristics of the information exhibition (synchronous, asynchronous, character size, line spacing, etc.).

The main function of the display module 301 is to receive information from the different modules in connection with screens, and to send it to the corresponding screen; and contrarily, to receive information from the screens by means of the digitalizing devices (touch screens or mouse) and send it to the corresponding modules This module works basically under two schemes: a synchronous one and an asynchronous.

Synchronous mode provides the option of using the electronic book as a conventional printed book, paginating the information and showing it according to the traditional upwards or downwards sequence of successive pages, Asynchronous mode facilitates the option of displaying the screens, one irrespective the other (not in a successive mode) which allows the different functions can be obtained on either screen, or else that the information on one of the screens is related to that on the other one; f or instance, the glossary of terms of the information displayed, can be correlated to a page in particular.

An addition function in the management of windows on either screen under both the synchronous and the asynchronous modes, which provides the option of displaying information sections related to the text or of messages from other modules or from the same system, such as, for instance, error messages.

Special option module 302 orders tools facilitating the manipulation of the information displayed in a form that attains a greater benefit during the use of the electronic book, such as to take notes on the text read, to activate the zoom function, and also the use of pointers for the automatic localization of the page shown during the last display session Multimedia module 303 coordinates the ingress and egress of sound, data and/or images from a compact disc, in such a manner that the same can be show in a simultaneous manner. The different types of information can be accessed or not at the same time, and said images can be static or dynamic.

Multimedia module provides a higher degree of interactivity between the user and the electronic book, when responds with images and sounds to the consults and questions made by the user.

The inlet/outlet (I/O) module 304 provides communication between the electronic book and the outer world through ports and drivers, Module 304 allows the control of the various devices to send or receive information, such as compact disc rader, screen managers (icons, menus, etc.), digitalizer devices drivers (mouse and touch screen) as well as some other type of digitalizer means.

Inlet/outlet (I/O) module 304 also controls a digitalized keyboard on screen, activated by means of an icon shown on the liquid crystal screens; said keyboard being operated by means of the digitalizer devices of said electronic book.

The digitalized keyboard availability on the screen does not discard the possibility to connect an outer keyboard by means of interfaces, when the user so requires.

Inlet/outlet module 304 also offers the tools needed to use the communication ports of said electronic book; which are used to access the information contained in other similar equipments, such as, for instance, computers, electronic libraries, other electronic books, etc.; and also to establish a communication with a remote position, for instance through a fax-modem, and to be interconnected to other physically different devices.

Function module 305 manages the functions directly related with the user of said electronic book, by setting the preferences of use and the actuation of the user.

Function module 305 comprises two submodules: a first submodule of personal preferences, which is in charge of the establishment of the user's preferences, such as the language to carry out the reading, the character size, the line spacing, etc.; and a second submodule, so-called of auxiliary functions, to make the use of said electronic book easer for the user.

With the purpose of offering said facilities, said second submodule comprises an in-line help screen, capable of solving any doubt about the operation of said electronic book; also offers a restart of said electronic book, in order to undo any previous change in the configuration thereof; enables a configuration option, wherein the several devices connected to said electronic book can be configured; and allows to integrally run the, information by using the swapping option. This latter option is used when, upon a modification of the character size, the size of the information being displayed exceeds the size of the electronic book screens.

Said processing module 306 processes all of the information, in such a manner that the user can easy and quickly manage the data and access the information as required; and also relates to one another the information encountered at different parts of said electronic book, The main functions thereof are to send, when so required, error messages or those related with the status of the electronic book; to select a text to which a special treatment will be given afterwards, such as, for instance, save it on the hard disk of the electronic book, print it or send it via fax; to make easy the search of information; to allow the positioning of the desired book section, through a simple command (equivalent to GOTO); and to provide for the correlation of the information located on different parts of the book, by using both screens; for instance, a same text can be correlated in two different languages or a text can be correlated to the glossary of terms, etc.

According to the above description, it can be observed that the electronic book of the present invention is devised as a novel, specific purpose, electronic device that can be termed as a smart book, designed to become a device capable of interactive management of information from electronic/optical storing devices.

Said electronic book is devised as an innovating alternative, enriched regarding the operation of printed books, an a universal communication means.

The device herein proposed gives the user unique—superior and versatile—possibilities for the access to information, compared to the options that can be obtained both with normal printed books, and with the existing electronic means during reading, study, recreation, investigation, etc., sessions. Furthermore, the advantages provided by the use of sound and image—Multimedia—are to be added, as well as other flexible accessories.

The electronic book of this invention becomes thus an innovating device employing state-of-the-art technology, and the outer appearance of which will resemble that of a conventional book, and the operation of which is based on the information reading generated on either a local or remote source; and the processing and displaying thereof by means of a double screen system.

Although specific embodiments of the present invention have been shown and disclosed hereinabove, it is to be pointed out that a number of modifications to said embodiments are possible without departing from the real scope of the invention. Therefore, the present invention should not be restricted except for the requirements of the prior art and by the spirit of the following claims.

What is claimed is:

1. An electronic book operating with local or remote optical/electronic sources, comprising:

two rectangular liquid crystal screen units of the touch screen type attached together by an assembling element provided therebetween to be freely spread out flat or folded up in half;

interconnecting elements required to interconnect hardware components;

a power supply system for operating the book; switch means for operating the book;

a slot for admittance of electronic/optical storing means;

inlet connections for interconnecting the electronic book with external devices;

a PCMCIA slot to add to said electronic book additional devices;

wherein said hardware components further comprise:

a RAM memory to store a part or all of the information of a compact disc being read, and also to store the information from a remote source, said RAM memory comprising a first part corresponding to memory circuits of said electronic book, and a second part corresponding to support circuits for the maintenance of the information contained in said RAM memory;

a hard disc to store information and/or partially or wholly download the files conforming said displayed book as well as the proper operation of said electronic book, and to store a part of a master program, which also is contained in a ROM type memory;

an audio processor for transforming the digital information contained on said compact disc or the remote source, into an analogical signal ready to be listened, including said audio processor and audio outlet to provide stereo audio through headphones or outer loudspeakers;

at least a video processor to manipulate the displaying of information, a digitalized keyboard, text selection, icons and/or menus, by means of said two screens of the electronic book, with all of the capabilities and flexibilities as determined by said master program; and digitalizing devices to show to said master program the position of a pointer on the screens of the electronic book, and to associate the position of said pointer with the menu options, the displayed information, the icons, the digitalized keyboard, the text selections, and also for enabling the different processes and functions available.

2. An electronic book according to claim 1, wherein the microprocessor of the electronic book is an at least 32-bits microprocessor with a minimum speed of 33 MHz.

3. An electronic book according to claim 1, wherein the compact disc reader of the electronic book is a 5¼ inches IDE technology reader.

4. An electronic book according to claim 1, wherein said RAM memory comprises dynamic RAM memory modules varying within a range of from 4 to 16 Mbytes of memory.

5. An electronic book according to claim 1, wherein said hard disk is a 120 Mbytes IDE hard disk.

6. An electronic book according to claim 1, wherein said video processor comprises two video processors with 1 Mbyte of memory and said screens have a resolution of 640×480 pixels and are able to manage up to 256 colors.

7. An electronic book according to claim 1, wherein said power supply system of the electronic book comprises a plurality of rechargable nickel hydride NiMH batteries.

8. An electronic book according to claim 1, wherein said digitalizing devices are touch screens or at least a mouse embodied to said electronic book.

9. An electronic book according to claim 1, wherein said master program comprises book contents display options, wherein said display options perform synchronous and asynchronous pagination, screen impedance and organization of information functions through the use of windows; said pagination functions being automatic pagination features that include programmable pagination on preset intervals.

10. An electronic book according to claim 9, wherein said master program includes a multimedia module which coordinates the flow of sound, data and/or images from the local or remote optical electronic book sources, such that they can be simultaneously shown in order to provide a higher degree of interactivity between the user and the electronic book, when responds with images and sounds to the consults and questions made by the user.

11. An electronic book according to claim 9, wherein said master program includes an input/output module for the communication between said electronic book and the outside world through points and drivers, said input/output module allowing the control of the various devices to send or receive information by the electronic book; said input/output module further controlling the digitalized devices and the digitalized keyboard of said electronic book by means of digitalized icons, and also providing the tools needed to operate communication ports of said electronic book, which are used to access book contents contained in, for instance, computers, electronic libraries, other electronic books, etc., also establishing communication with remote positions and to be interconnected to other physically different devices.

12. An electronic book according to claim 9, wherein said master program includes a function module to manage the functions directly, establishing the preferences of use and the actuation of the user, said function module including personal preferences, such as the language to carry out the reading, combination of colors, design, and the like, and auxiliary functions designed to help the user to make the use of said electronic book easier, including features such as in-line help, configuration options, swapping option, and the like.

13. An electronic book according to claim 9, wherein said master program includes a processing module which allows core capabilities and feature facilities to the electronic book through a plurality of functions which allows the process of the entire content of the displayed book from a local or remote source; said processing module including options such as text selection under several criteria, searching tools, text correlation for correlating a same tact in two different languages or for correlating a text to a glossary of terms; input of personal notes through the plurality of available digitalized input resources included in said electronic book; zoom tooling on graphics, maps, and pictures; and, functions for creation and management of files.

14. An electronic book according to claim 9, wherein said electronic book includes go-to options to access book contents and featuring options to the edition of font size and both, enlargement and contraction of contents.

* * * * *